UNITED STATES PATENT OFFICE.

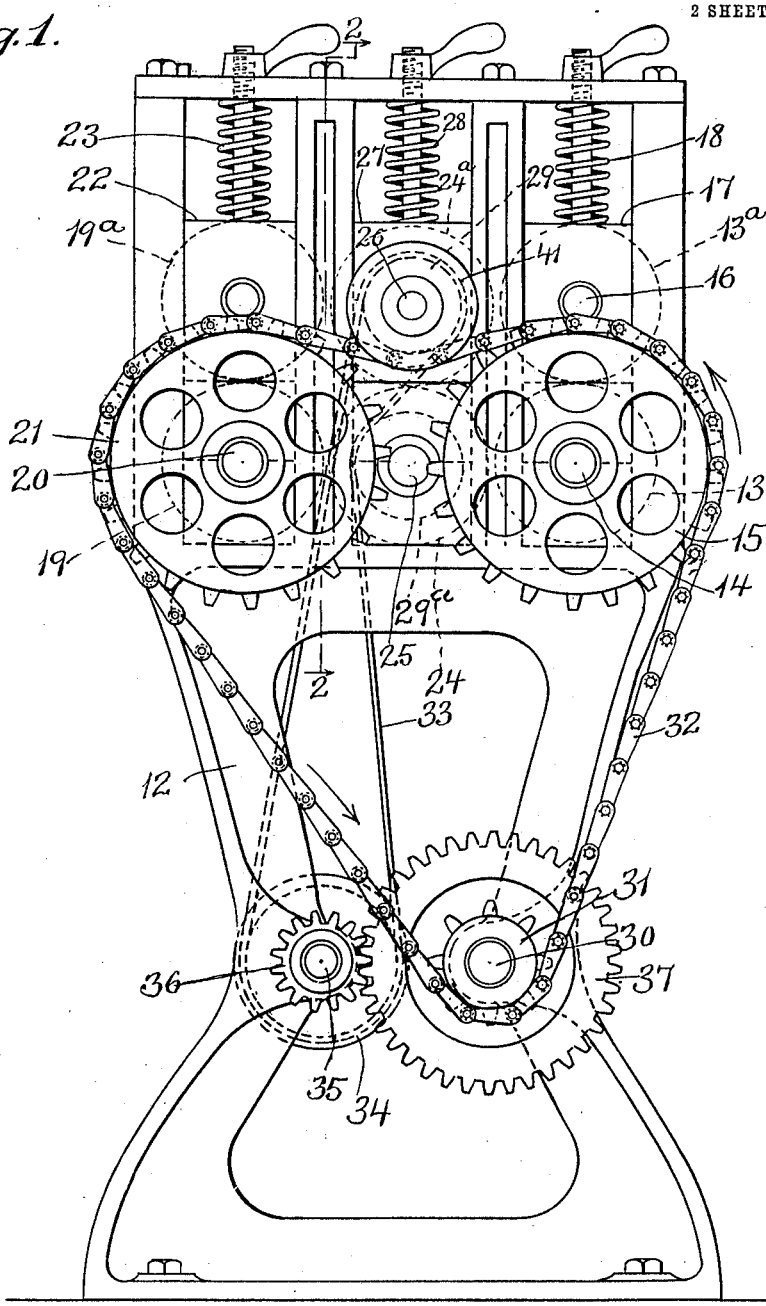

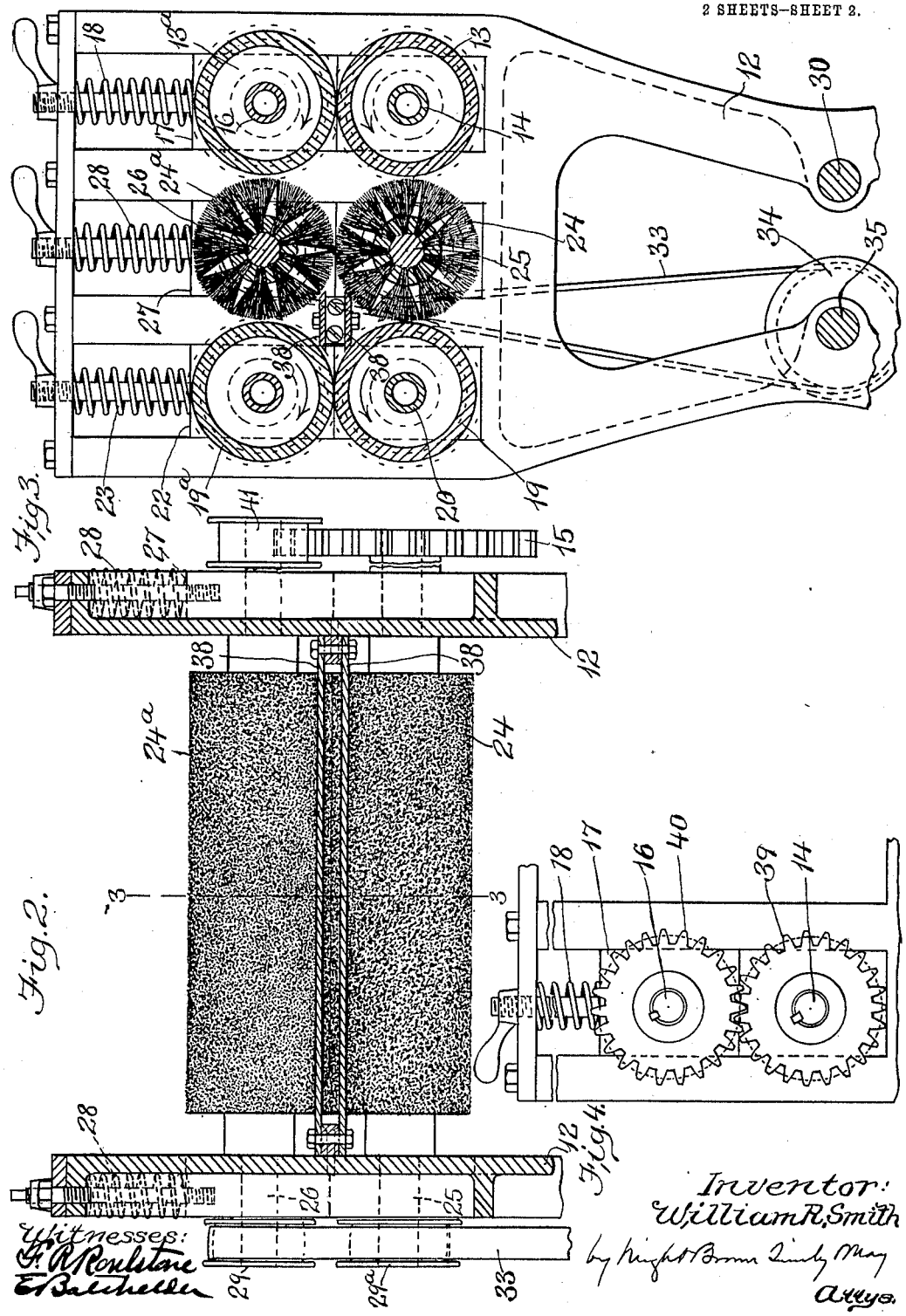

WILLIAM R. SMITH, OF BUFFALO, NEW YORK, ASSIGNOR TO BUFFALO LEATHER CO., OF BUFFALO, NEW YORK, A CORPORATION OF WEST VIRGINIA.

MACHINE FOR BRUSHING AND CLEANING LEATHER.

1,021,007.  Specification of Letters Patent.  Patented Mar. 26, 1912.

Application filed January 30, 1911. Serial No. 605,558.

*To all whom it may concern:*

Be it known that I, WILLIAM R. SMITH, of Buffalo, in the county of Erie and State of New York, have invented certain new and useful Improvements in Machines for Brushing and Cleaning Leather, of which the following is a specification.

This invention has for its object to provide a machine for brushing and cleaning leather and particularly leather in the form of outer soles for boots and shoes which has been treated with a water-proofing composition of a semi-liquid or viscous nature, the machine being intended to remove from the soles any surplus water-proofing material that may adhere to the surfaces of the sole, so that the soles, after passing through the machine, will be clean and will present a smooth and attractive appearance.

The invention consists in the improvements which I will now proceed to describe and claim.

Of the drawings,—Figure 1 represents a side elevation of a machine embodying my invention. Fig. 2 represents a section on line 2—2 of Fig. 1. Fig. 3 represents a section on line 3—3 of Fig. 2. Fig. 4 represents an elevation of a part of the opposite side of the machine from that shown by Fig. 1.

The same reference characters indicate the same parts wherever they occur.

The frame of the machine comprises end members 12 connected by suitable transverse members and spaced apart to receive between them the feed rolls and rotary brushes hereinafter described. At the front portion of the frame is a pair of feed rolls 13 and 13$^a$ arranged one above the other, the lower roll 13 being attached to a shaft 14 which is journaled in fixed bearings in the frame of the machine and is provided with a sprocket wheel 15 located outside the frame. The upper roll 13$^a$ has its shaft 16 journaled in bearing blocks 17 which are movable vertically in guides on the frame and are pressed downwardly by springs 18, the upper roll being therefore yieldingly pressed toward the lower roll. Journaled in fixed bearings at the rear side of the machine is a lower feed roll 19, the shaft 20 of which is provided with a sprocket wheel 21.

19$^a$ is an upper feed roll journaled in vertically movable bearing blocks 22 movable in guides on the frame and pressed downwardly by springs 23, the upper roll 19$^a$ being therefore pressed yieldingly toward the lower roll 19.

The rolls 13 and 13$^a$ are hereinafter referred to as the receiving feed rolls and the rolls 19 and 19$^a$ as the delivering feed rolls, the two pairs of rolls being spaced apart sufficiently to receive between them a pair of rotary brushes 24 and 24$^a$. The shaft 25 of the lower brush is journaled in fixed bearings on the frame of the machine. The shaft 26 of the upper brush is journaled in vertically movable bearing blocks 27 movable in guides on the frame of the machine and pressed downwardly by springs 28, the upper brush being therefore movable toward and from the lower brush. The shaft 26 of the upper brush is provided with a pulley 29, and the shaft 25 of the lower brush is provided with a pulley 29$^a$.

30 represents a shaft journaled in bearings on the lower portion of the frame and provided with a sprocket wheel 31.

32 represents a drive chain engaging the sprocket wheels 31, 15, and 21, as shown by Fig. 1, said chain imparting rotary movement in the direction indicated by the arrows to the lower feed rolls 13 and 19.

33 represents a belt which engages the pulley 29 on the shaft of the upper brush, the pulley 29$^a$ on the shaft of the lower brush, and a driving pulley 34 on a driving shaft 35 which is connected with a suitable motor, and is provided with a small gear 36 meshing with a larger gear 37 on the shaft 30, the gear 37 being preferably about three times the diameter of the gear 36. The shafts of the lower feed rolls are connected with the shafts of the upper feed rolls by gears 39, 40 (Fig. 4).

41 represents a tightening roll mounted on the shaft 26 and arranged to bear on and slightly deflect a portion of the chain 32.

It will now be seen that, when the driving shaft 35 is rotated, the feed rolls are simultaneously driven by the chain 32 and the gears 39, 40, and that the brushes are at the same time driven by the belt 33, and the pulleys 29 and 29$^a$, the brushes being driven in the same direction as the feed rolls. The upper feed rolls, pressed yieldingly toward the lower rolls as described, are adapted to conform to the thickness of the leather passing between the rolls.

The parts of the described driving mechanism are so proportioned that the feed rolls are driven at a relatively slow speed and the brushes at a considerably faster speed. The sprocket wheel 31 is relatively small, the sprocket wheels 15 and 21 on the lower feed rolls are relatively large, and the pulleys 29 and 29ª on the rotary brush shafts are considerably smaller than the sprocket wheels 15 and 21, the respective diameters being preferably as shown by Fig. 1. A leather sole to be treated, said sole being understood to have been treated with a water-proofing composition, is presented to the nip of the receiving feed rolls and is carried thereby to the nip of the rotary brushes, and between said brushes to the nip of the delivering feed rolls. The space between the receiving and delivering feed rolls is preferably such that a sole, passing endwise from roll to roll, will reach the delivering rolls before it is released by the receiving rolls. Any sole which is shorter than the distance between the nips of the two pairs of rolls will be advanced to the nip of the delivering rolls by the brushes, a pair of parallel guides 38 being located between the brushes and the delivering feed rolls and arranged to guide a sole from the brushes to the nip of the delivering rolls. The slowly rotating feed rolls cause the soles engaged thereby to pass at a relatively slow speed between the brushes, whose rotation is much more rapid than that of the feed rolls so that they effectively clean and polish the material passing between them. The peripheries of the brushes are in close proximity to each other so that the bristles, of which the brushes are composed, overlap the edges of the soles and remove any water-proofing material therefrom.

The feed rolls are preferably hollow and are provided with means for admitting steam or other heating medium so that the peripheries of the feed rolls are heated and serve to soften the water-proofing composition on the surfaces of the soles, enabling the brushes to effectively remove all of the surplus material. The delivering rolls prevent the more rapidly rotating brushes from forcing the soles outwardly, each sole being controlled first by the receiving rolls and then by the delivering rolls, so that, during the entire passage of a sole through the machine, it is controlled by one or both pairs of feed rolls and is caused to move more slowly than the surface movement of the brushes.

While I do not limit myself to the heating of the feed rolls, I consider it desirable to heat the receiving rolls for the purpose of softening the water-proofing composition. The delivering rolls may be heated or not as may be preferred. The feed rolls serve to compress and harden the soles passing between them, thus increasing their resistance to wear.

I claim,—

A machine of the character specified, comprising a pair of receiving feed rolls, a pair of delivering feed rolls spaced from the receiving rolls, a pair of rotary brushes located between the receiving and the delivering rolls, the lower feed roll of each pair being provided with a relatively large sprocket wheel and each brush being provided with a smaller pulley, a sprocket shaft having a sprocket wheel of smaller diameter than the feed roll sprocket wheels, a drive chain engaged with the driving shaft sprocket wheel, and with the feed roll sprocket wheels, a driving shaft geared to the sprocket shaft and having a driving pulley, and a belt engaged with the driving shaft pulley and with the brush pulleys, the upper feed rolls being pressed yieldingly toward the lower feed rolls, and the upper brush being yieldingly pressed toward the lower brush.

In testimony whereof I have affixed my signature, in presence of two witnesses.

WILLIAM R. SMITH.

Witnesses:
C. F. BROWN,
E. BATCHELDER.

---

Copies of this patent may be obtained for five cents each, by addressing the "Commissioner of Patents, Washington, D. C."